(12) United States Patent
Qiu et al.

(10) Patent No.: US 7,964,019 B2
(45) Date of Patent: Jun. 21, 2011

(54) GAS SEPARATION MEMBRANE

(75) Inventors: Jun Qiu, Weert (NL); Klaus-Viktor Peinemann, Geesthacht (DE); Jan Wind, Lauenburg (DE); Holger Pingel, Geesthacht (DE)

(73) Assignee: GKSS-Forschungszentrum Geesthacht GmbH (DE)

( * ) Notice: Subject to any disclaimer, the term of this patent is extended or adjusted under 35 U.S.C. 154(b) by 105 days.

(21) Appl. No.: 12/407,055

(22) Filed: Mar. 19, 2009

(65) Prior Publication Data
US 2009/0255405 A1 Oct. 15, 2009

Related U.S. Application Data

(63) Continuation of application No. PCT/EP2007/008112, filed on Sep. 18, 2007.

(30) Foreign Application Priority Data

Sep. 19, 2006 (DE) .................. 10 2006 044 635

(51) Int. Cl.
*B01D 53/22* (2006.01)
*B01D 71/08* (2006.01)
*B01D 67/00* (2006.01)
*B01D 69/10* (2006.01)

(52) U.S. Cl. ............... 95/45; 95/50; 95/51; 95/54; 96/4; 96/11; 96/12; 96/13; 96/14; 55/524; 55/DIG. 5; 210/640; 210/500.27; 210/500.28; 210/500.29; 210/500.3

(58) Field of Classification Search .............. 96/4, 7, 96/8, 10, 11, 12, 13, 14; 95/45, 47, 50, 51, 95/52, 54; 55/524, DIG. 5; 210/490, 640, 210/500.27, 500.28, 500.29, 500.3, 500.31, 210/500.32
See application file for complete search history.

(56) References Cited

U.S. PATENT DOCUMENTS

| | | | | |
|---|---|---|---|---|
| 4,609,468 A | * | 9/1986 | Cramm | 96/13 |
| 4,921,651 A | * | 5/1990 | Polak et al. | 96/4 |
| 5,891,572 A | * | 4/1999 | Macheras et al. | 96/10 |

(Continued)

FOREIGN PATENT DOCUMENTS

DE 19916802 A1 10/2001

(Continued)

OTHER PUBLICATIONS

Filho et al., "Water Flux through Blends from Waste Materials: Cellulose Acetate (from Sugar Cane Bagasse) with Polystyrene (from Plastic Cups)", Apr. 2005, Journal of Applied Polymer Science, vol. 96, pp. 516-522.*
Baker, R., "Membrane Technology in the Chemical Industry: Future Directions", Wiley-VCH Verlag GmbH, 2001, 268-295.
Kulprathipanja, Santi. "Mixed Matrix Membrane Development", Annals of the New York Academy of Sciences, 2003, 361-369.

(Continued)

Primary Examiner — Jason M Greene
(74) Attorney, Agent, or Firm — Michaud-Kinney Group LLP

(57) ABSTRACT

A membrane for gas separation includes a porous support layer and a separation layer. The separation layer comprises a mixture of one or more saccharide derivatives and one or more homopolymers. The saccharide derivative(s) may have a cyclic structure with five or six ring atoms, or a linear structure, or may include monosaccharide derivatives which are bound via glycoside bonds, and the number of monosaccharides bound in this manner may be 2 to 1,000. A membrane can be produced by preparing a homogeneous solution which comprises a saccharide derivative and a homopolymer in a solvent; and pouring the homogenous solution onto a support layer. The membrane may be used in a gas separation module the operation of which makes use of the membrane.

20 Claims, 1 Drawing Sheet

U.S. PATENT DOCUMENTS

| | | |
|---|---|---|
| 6,503,295 B1 | 1/2003 | Koros et al. |
| 6,562,110 B2 | 5/2003 | Koros et al. |
| 7,490,725 B2 * | 2/2009 | Pinnau et al. ............ 96/11 |
| 2004/0187558 A1 * | 9/2004 | Dye et al. ............ 96/4 |
| 2005/0087491 A1 * | 4/2005 | Hennige et al. ............ 96/4 |

FOREIGN PATENT DOCUMENTS

| | | |
|---|---|---|
| EP | 1086737 A2 | 3/2001 |
| FR | 2776287 A1 | 9/1999 |
| FR | 2786710 A1 | 6/2000 |
| WO | 8904201 | 5/1989 |
| WO | 9922852 | 5/1999 |
| WO | 03072232 A1 | 9/2003 |

OTHER PUBLICATIONS

Jia, Mengdong; et al. "Molecular Sieving Effect of the Zeolite-Filled Silicone Rubber Membranes in Gas Permeation", Journal of Membrane Science, 57, (1991), 289-296.

Shishatskii et al., "Effects of film thickness on density and gas permeation parameters of glassy polymers", Journal of Membrane Science 112 (1996) 275-285.

* cited by examiner

GAS SEPARATION MEMBRANE

CROSS-REFERENCE TO RELATED APPLICATION

This is a continuation of International Application PCT/EP2007/008112, with an international filing date of Sep. 18, 2007, and which was published in German on Mar. 27, 2008, which is incorporated herein by reference, in its entirety.

FIELD OF THE INVENTION

The invention relates to a membrane for gas separation, a method for the production of the membrane, and to a gas separation module with a corresponding membrane and a method for the operation of such a gas separation module.

BACKGROUND

There is a growing need for air enriched with oxygen for industrial applications, in particular with a share between 25% and 35%. Combustion processes can be performed more efficiently in this manner. Membrane processes are suitable for oxygen enrichment. The membranes employed are semi-permeable, selective barriers which serve to separate gaseous or vaporous multicomponent mixtures. The substances preferably passing through the membrane are thereby enriched in the permeate and the substances held back by the membrane are located in the retentate. The substance separation takes place through the different permeation rates of the gases. A measure for the ability of a membrane to separate two gases is the ratio of their permeabilities, which is called selectivity. Particularly important for the cost effectiveness of a membrane technology is the use of a membrane with a high separation factor and a high gas flow, i.e., with a high selectivity and a high permeability. The separation factor is a material property, which can be increased for example through the development of special polymers, while the gas flow is a membrane property, which is among other things improved in that the effective thickness of a selective separation layer is reduced. However, a layer cannot be applied at just any thickness to a support membrane without provoking defects in this layer.

Moreover, in the case of long-term use of a membrane, the lowest possible fouling rate should be ensured, i.e., a low rate of deposition of dissolved substances on the outer membrane surface. Cost-effective production is also an important factor in the development of membranes.

Already known membranes are either not selective enough for an oxygen/nitrogen separation or they have a throughput that is too low, which requires membrane surfaces that are too large. A silicon composite membrane with a layer thickness of 1 µm has for example an oxygen flow of 1.6 $m^3/m^2$ h bar, but the oxygen/nitrogen selectivity is only 2.1. This is too low for most industrial applications. Membranes made of other polymers have a higher selectivity, but the oxygen flow generally lies far below 0.2 $m^3/m^2$ h bar, which requires membrane surfaces that are too large, see R. Baker: "Membrane Technology in the Chemical Industry: Future Directions", Wiley-VCH, Weinheim, 2001, pages 268-295.

Furthermore, it was attempted to further develop membranes with a mixed matrix to the effect that zeolites, in particular silicalites, were introduced to cellulose acetate. The oxygen/nitrogen selectivity was thus increased from 3.0 to 3.6, see S. Kulprathipanja: "Mixed Matrix Membrane Development", Annals of the New York Academy of Sciences, 2003, pages 361-369.

M. Jia et al. report in "Molecular sieving effect of the zeolite-filled silicone rubber membranes in gas permeation", Journal of Membrane Science, 57, 1991, page 289-296, on membranes with a mixed matrix made of silicalite and PDMS (polydimethylsiloxane), which have a slightly increased oxygen/nitrogen selectivity.

Membranes with a mixed matrix, which are made of carbon molecular sieves and polyimides and which also have an improved combination of permeability and selectivity, are known from U.S. Pat. No. 6,562,110.

The aforementioned membranes are not suitable for use on an industrial scale. For example, one disadvantage is that the membrane properties could not be improved to the required degree through the introduction of additional filler material. Another disadvantage is that reproducible membrane production is not possible, since the filler material is not evenly distributed in the membrane. If the filler material particles also turn out to be too large, the membranes become too thick and no longer ensure sufficient permeability.

SUMMARY OF THE INVENTION

The present invention resides in one aspect in a membrane for gas separation. The membrane includes a porous support layer and a separation layer, the separation layer comprising a mixture of a saccharide derivative and a homopolymer. The saccharide derivative may have a cyclic structure with five or six ring atoms, or a linear structure, or may comprise monosaccharide derivatives that are bound via glycoside bonds, wherein the number of monosaccharide derivatives bound in this manner is 2 to about 1,000, or a combination of any two or more thereof.

The invention resides in another aspect in a method for the production of a membrane. The method includes preparing a homogeneous solution which comprises a saccharide derivative and a homopolymer in a solvent; and pouring the homogenous solution onto a support layer.

The invention resides in another aspect in a gas separation module with a membrane as described herein, and in still another aspect in a method for the operation of the gas separation module, comprising flowing a gas through the gas separation module.

DETAILED DESCRIPTION OF THE INVENTION

Figure 1:
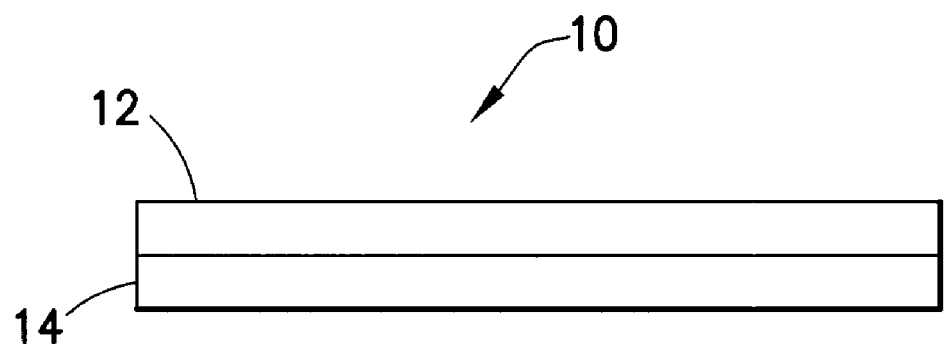
FIG. 1 is a schematic cross-section of a membrane according to one illustrative embodiment.

One broad aspect of the invention relates to a membrane for gas separation. In one embodiment, a membrane indicated generally at 10 in FIG. 1, includes a porous support layer 12 and a separation layer 14. The separation layer 14 comprises a mixture of one or more saccharide derivatives and one or more homopolymers. The porous support layer 12 may be made of a polymer or inorganic material such as, in one embodiment, a ceramic material.

The homopolymer of the separation layer 14 may comprise, in various non-limiting embodiments, ethylcellulose, cellulose acetate and/or poly-4-methyl-1-pentene.

In various embodiments, the saccharide derivative may be based on a saccharide having a cyclic structure with five or six ring atoms, or a linear structure, or may include monosaccharide derivatives which are bound via glycoside bonds, or a combination thereof. When present, the number of monosaccharides bound in this manner may be 2 to about 1,000.

In some embodiments, such membranes exhibit a high permeability and a high selectivity. In addition, some embodiments are simple and cost effective to produce so that industrial use is possible. A method for the production of such a membrane is described herein. In one specific embodiment, the membrane can be used in, for example, a gas separation module to provide a novel gas separation module. The invention also provides and a method for the operation of such a gas separation module, which includes flowing a gas into the gas module to separate the gas into a retentate gas and a permeate gas.

Oxygen flow through some such membranes has been shown to increase considerably due to saccharide derivatives in the membrane.

In one embodiment the membrane contains about 10 to about 50 wt. % saccharide derivative(s), based on the weight of the membrane.

In various embodiments, the saccharide derivatives have structures of the formulas STR1, STR2 or STR3, wherein:

STR1 is:

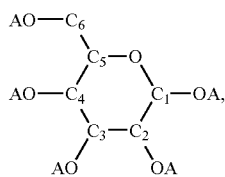

STR2 is:

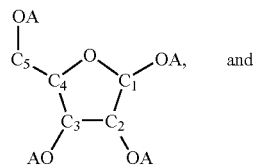

and

STR3 is:

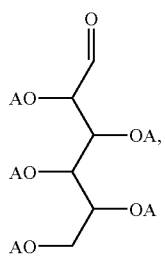

wherein A is hydrogen, a silyl-containing substance or an acetate-containing substance of the formulas STR4 or STR5, wherein STR4 is:

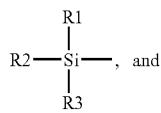

and

STR5 is:

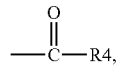

and wherein R1, R2, R3 is hydrogen, an alkyl, alkenyl, aryl, alkylaryl or arylalkyl with 1 to 10 carbon atoms and wherein R4 is an alkyl, alkenyl, aryl, alkylaryl or arylalkyl with 1 to 10 carbon atoms.

In one embodiment, the saccharide derivative includes monosaccharide derivatives that are bound via glycoside bonds which include C1-C4, C1-C1 or C1-C6 bonds, or a combination of any two or more thereof.

In one embodiment the membrane contains saccharide derivatives which come from acetylisation or silylation of saccharides with a cyclic structure with five or six ring atoms, or a linear structure, including, for example, a monosaccharide, a disaccharide, a trisaccharide or a dextrin, or a combination of any two or more thereof.

In one specific embodiment wherein the saccharide derivative includes a monosaccharide derivative, the monosaccharide may be arabinose, lyxose, ribose, desoxyribose, xylose, ribulose, xylulose, allose, altose, galactose, glucose, gulose, idose, mannose, tagatose, fructose, mannoheptulose, sedoheptulose, octolose, 2-keto-3-deoxy-manno-octonate, or sialose, or a combination including any two or more thereof.

In another specific embodiment wherein the saccharide derivative includes a disaccharide derivative, the disaccharide may be sucrose, lactose, maltose, or trehalose, or a combination including any two or more thereof.

In yet another specific embodiment wherein the saccharide derivative includes a dextrin derivative, the dextrin may be α-cyclodextrin, β-cyclodextrin, γ-cyclodextrin, or other dextrins of different molecular weights of about 900 to about 1,000,000 Dalton, or a combination including any two or more thereof.

In still another specific embodiment, the saccharide derivatives may be obtained, for example, through acetylisation or silylation of saccharides with a high molecular weight, such as, for example, cellulose, starch, or glycogen, or a combination including any two or more thereof.

According to another embodiment, a membrane may be provided wherein up to 75 to 100 wt. % of the saccharide derivatives are obtained from acetylisation or silylation, and the saccharide derivatives are dissolved homogeneously with the homopolymer in an organic solvent.

In certain embodiments, the saccharide derivatives described herein have an insignificantly low vapor pressure and are at least temperature-stable at over 100° C. For example, a saccharide derivative may have a vapor pressure of about 0.1 hPa or less at 20° C. This promotes a long service life and higher membrane strength.

In various optional embodiments, the separation layer 14 contains about 5 to about 60 wt. % saccharide derivative, based on the combined weight of saccharide derivative plus homopolymer.

The porous support layer 12 may optionally comprise any one of polysulfone, polyethersulfone, polyphenyl sulfone, polyacrylonitrile, cellulose acetate, polyetherimide, and polyimide, or a combination including any two or more thereof. In another embodiment, the porous support layer 12 may comprise a ceramic, as stated previously.

A membrane as described herein can be made, for example, by producing a homogeneous solution by dissolving one or more saccharide derivatives and one or more homopolymers in a suitable solvent, and pouring the homogenous solution onto a support layer 12. The solvent can then be removed, leaving a film, i.e., a separation layer 14, comprising a mixed matrix of saccharide derivative(s) and homopolymer(s).

It should be understood that, within the scope of the present invention, the homogeneous solution may be a casting solution and the pouring of the homogeneous solution encompasses a casting of the homogeneous solution.

Figure 2:
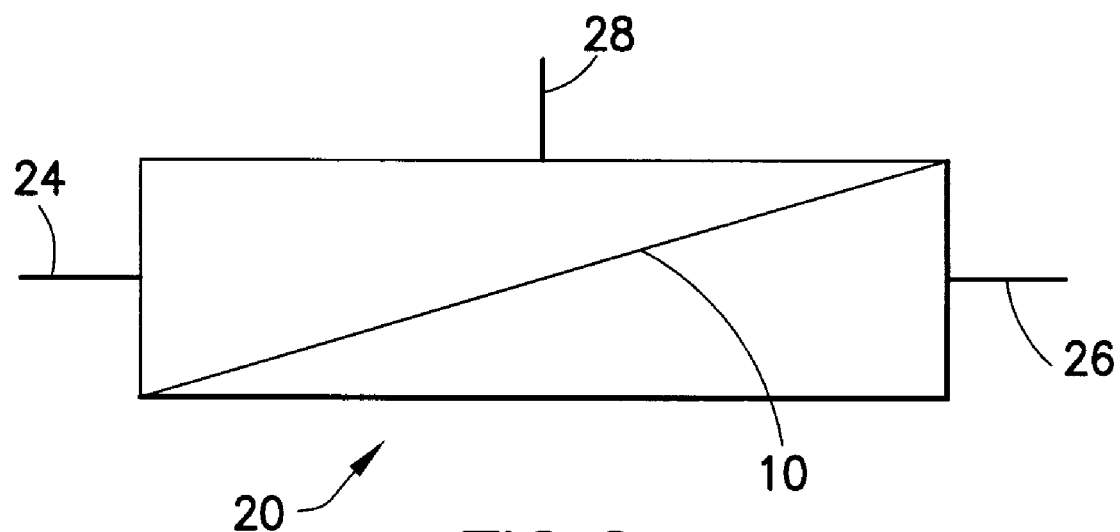
FIG. 2 is a schematic illustration of a gas separation module according to another illustrative embodiment.

A membrane as described herein is useful in a gas separation module. An exemplary embodiment of a gas separation module 20 is shown schematically in FIG. 2. The gas separation module 20 according to FIG. 2 contains the membrane 10. A flow of a mixture of gases enters the module 20 via an inlet 24. The gases are separated in the module 20 by means of the membrane 10. The permeate exits the gas separation module 20 via a permeate outlet 26, the retentate exits the gas separation module 20 via a retentate outlet 28. In a particular embodiment, such a gas separation module is useful for the production of an oxygen-enriched gas.

The following non-limiting examples illustrate selected embodiments of the invention, which is described more broadly elsewhere herein.

Example 1

This example illustrates a procedure for the production of TMSS (trimethylsilysaccharose) from a saccharide (which can be procured commercially, for example, from Aldrich), HMDS (hexamethyldisilazane) and solvents (which can be procured commercially, for example, from Merck).

Before its use, the saccharide is dried over night in a vacuum at 100° C. Three grams (3 g) of the saccharide are mixed with 120 milliliters (ml) DMAc (dimethylacetamide) in a round bottom flask with 250 ml volumetric capacity and are stirred at 80° C. in a controlled nitrogen atmosphere. Thirty (30) ml of HMDS are added dropwise via a dropping funnel over 3 hours (h). The mixture is then continuously stirred over 9 h to increase the degree of the silylation. The mixture is allowed to slowly cool to room temperature. The mixture is then poured into a separating funnel and is added to 400 ml of ice water. One hundred fifty (150) ml of hexane are then added to extract the product. The product extracted in the hexane is dried with dry sodium sulfate and added to a rotary evaporator to remove the solvent. The raw product is then dried under vacuum conditions at room temperature for 24 h. The transparent, liquid product may be characterized by NMR (nuclear magnetic resonance) and TGA (thermogravimetry). The degree of silylation is generally 84% with a good reproducibility, which can be estimated via a $^1$H-NMR spectroscopy as per Nouvel et al. The thermal stability of TMSS is retained up to 140° C., measured via TGA analysis. The density (mass per unit volume) of TMSS is 0.97-0.99 g/cm$^3$. The known solubility of TMSS points to a large bandwidth of potential solvents ranging from highly polar solvents like methanol up to highly non-polar solvents like cyclohexane.

Example 2

This example illustrates a procedure for the preparation of membranes that comprise mixed matrices of ethylcellulose and TMSS (trimethylsilylsaccharose).

EC (ethylcellulose) with an ethoxyl content of 46% (which can be obtained from Aldrich) is used to prepare a 2 wt./vol. % EC polymer solution in dry chloroform in a glass container at room temperature. Various quantities of TMSS are then added to separate samples of the EC polymer solution, yielding transparent homogeneous polymer mixtures. A homogeneous solution is prepared for use as a casting solution from each of the transparent homogeneous polymer mixtures by stirring over night and filtration before casting. Each casting solution is then casted by being poured into an aluminum ring set on a dust-free, dry, flat glass plate. The solvent is then slowly evaporated over the duration of a day by placing a glass cover over the casting solution at room temperature, leaving a EC/TMSS separation layer (referred to herein as a "film"). After the evaporation of the solvent, the film is dried further over night in an oil-free vacuum in order to completely remove any remaining solvent. The removal of the film from the glass plate is performed through flooding with water and subsequent redrying over night in an oil-free vacuum. Generally, EC/TMSS composite films are expected to be transparent and to lack particular properties with respect to optical test methods. They exhibit excellent miscibility between EC and the filler material, i.e., the TMSS. The thickness of the film varies between 60 μm and 80 μm, measured using a digital micrometer with an accuracy of ±1 μm. The film is finally cut into round sections with a diameter of 4.6 cm for a time-lag test cell for the measurement of its permeability for different gases.

Example 3

A series of EC/TMSS films is prepared according to Example 2, and the gas permeability coefficients and the loading ratio of the filler material in the homogeneous solution from which the films were made (based on volumes of EC polymer solution and TMSS) are shown in Table 1.

TABLE 1

Permeability (Barrer*) of EC films with different shares of TMSS

| Film | He | $H_2$ | $O_2$ | $N_2$ | $CH_4$ | $CO_2$ |
|---|---|---|---|---|---|---|
| EC | 40.2 | 56.0 | 11.8 | 3.48 | 7.11 | 70.9 |
| EC + TMSS (11.4 Vol. %) | 48.7 | 67.5 | 14.6 | 4.30 | 9.0 | 86.3 |
| EC + TMSS (26.4 Vol. %) | 51.5 | 70.7 | 16.8 | 4.97 | 10.4 | 88.0 |

*1 Barrer = $10^{-10}$ cm$^3$ (STP) · cm/(cm$^2$ · s· cmHg)
STP: Standard temperature and pressure Example 4

A series of EC/TMSG (trimethylsilylglucose) films is prepared according to the manufacturing process in Example 2, and the gas permeability coefficients and the loading ratio of the filler material in the homogeneous solution from which the films were made (based on volumes of EC polymer solution and TMSS) are shown in Table 2.

TABLE 2

Permeability (Barrer*) of EC films with different shares of TMSG

| Films | He | $H_2$ | $O_2$ | $N_2$ | $CH_4$ | $CO_2$ |
|---|---|---|---|---|---|---|
| EC | 40.2 | 56.0 | 11.8 | 3.48 | 7.11 | 70.9 |
| EC + TMSG (11.4 Vol. %) | 51.9 | 72.6 | 16.8 | 4.92 | 10.9 | 94.0 |
| EC + TMSG (26.4 Vol. %) | 53.5 | 73.3 | 18.2 | 5.31 | 11.7 | 90.0 |
| EC + TMSG (43.4 Vol. %) | 70.9 | 99.3 | 30.5 | 9.94 | 22.8 | 142 |
| EC + TMSG (65.9 Vol. %) | 109 | 162 | 58.6 | 21.5 | 58.5 | 286 |

*1 Barrer = $10^{-10}$ cm$^3$ (STP) · cm/(cm$^2$ · s · cmHg)
STP: Standard temperature and pressure

Example 5

A series of CA (cellulose acetate)/TMSG films is prepared according to the manufacturing process in Example 2, wherein THF (tetrahydrofurane) instead of chloroform is used as the solvent, and the gas permeability coefficient and the loading ratio of the filler material in the homogeneous solution from which the films were made (based on volumes of EC polymer solution and TMSG) are shown in Table 3. The selectivity of the membranes for gases with respect to nitrogen can be deduced from Table 3 by taking the ratio of the permeability of the respective membrane for the selected gas over the permeability for nitrogen.

TABLE 3

Permeability (Barrer*) of CA films with different shares of TMSG

| Film | He | $H_2$ | $O_2$ | $N_2$ | $CH_4$ | $CO_2$ |
|---|---|---|---|---|---|---|
| CA | 15.5 | 12.75 | 1.10 | 0.26 | 0.31 | 7.14 |
| CA + TMSG (10.1 wt. %) | 21.22 | 19.09 | 1.96 | 0.45 | 0.58 | 11.60 |
| CA + TMSG (25.8 wt. %) | 30.57 | 30.21 | 3.74 | 0.84 | 1.16 | 20.36 |

*1 Barrer = $10^{-10}$ $cm^3$ (STP) · cm/($cm^2$ · s · cmHg)
STP: Standard temperature and pressure

Example 6

Production of a Membrane with a Mixed Matrix Made of Ethylcellulose/TMSS Composite Films A microporous PAN (polyacrylonitrile) membrane is first covered with a thin, crosslinked PDMS (polydimethylsiloxane) layer to produce a support layer. In a second step, the PDMS-covered support layer is dipped into an immersion bath comprising a homogeneous solution of a saccharide derivative and a homopolymer to provide cover layer (i.e., a separation layer) on the support layer. The cover layer consists of 0.2 to 0.3 wt. % ethylcellulose and 0.04 to 0.12 wt. % TMSS in toluene.

Example 7

A series of EC/TMSS composite films is prepared according to Example 6. The data for oxygen permeance and nitrogen permeance of the films, based on actual flows, are shown in Table 4. (In contrast, Tables 1, 2 and 3 report permeability coefficients normalized to a 1 cm-thick membrane.) Also reported in Table 4 are the oxygen/nitrogen selectivity, the loading ratio of EC in the EC polymer solution, and the loading ratio of the filler material in the homogeneous solution from which the films were made (based on volumes of EC polymer solution and TMSS). The composite films were tested under increasing pressure with equipment manufactured in the GKSS research center.

TABLE 4

Oxygen permeance, nitrogen permeance and oxygen/nitrogen selectivity in EC/TMSS composite membranes

| Membrane Components | Permeance ($m^3/m^2$h bar) | | Selectivity |
|---|---|---|---|
| | $O_2$ | $N_2$ | $O_2/N_2$ |
| EC 0.2% | 0.93 | 0.35 | 2.67 |
| EC 0.3% | 0.96 | 0.33 | 2.94 |
| EC (0.2%) + TMSS (0.04%) | 1.03 | 0.34 | 3.05 |

TABLE 4-continued

Oxygen permeance, nitrogen permeance and oxygen/nitrogen selectivity in EC/TMSS composite membranes

| Membrane Components | Permeance ($m^3/m^2$h bar) | | Selectivity |
|---|---|---|---|
| | $O_2$ | $N_2$ | $O_2/N_2$ |
| EC (0.2%) + TMSS (0.08%) | 1.21 | 0.41 | 2.96 |
| EC (0.3%) + TMSS (0.06%) | 0.71 | 0.22 | 3.28 |
| EC (0.3%) + TMSS (0.12%) | 0.86 | 0.28 | 3.08 |

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

Although the invention has been described with reference to particular embodiments thereof, it will be understood by one of ordinary skill in the art, upon a reading and understanding of the foregoing disclosure, that numerous variations and alterations to the disclosed embodiments will fall within the scope of this invention and of the appended claims.

What is claimed is:

1. A membrane for gas separation, comprising:
   a porous support layer; and
   a separation layer, comprising a mixture of a saccharide derivative and a homopolymer;
   wherein the saccharide derivative has a cyclic structure with five or six ring atoms, or a linear structure, or comprises monosaccharide derivatives which are bound via glycoside bonds, wherein the number of monosaccharides bound in this manner is 2 to about 1,000, or a combination of any two or more thereof;
   wherein the saccharide derivative is obtained through acetylisation of starch or glycogen or through silylation of cellulose, starch or glycogen.

2. The membrane according to claim 1, wherein the membrane contains about 10 to about 50 wt. % saccharide derivative.

3. The membrane according to claim 1, comprising a saccharide derivative having structure of the formulas STR1, STR2 or STR3, or a combination of any two or more thereof, wherein:

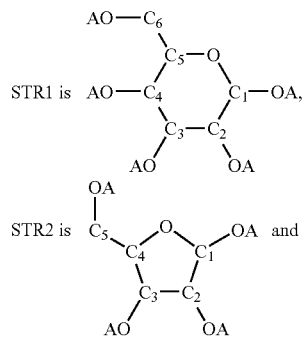

STR3 is

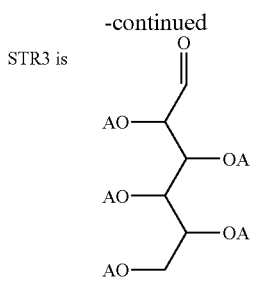

and wherein A is hydrogen, a silyl-containing substance or an acetate-containing substance of the formulas STR4 or STR5, wherein

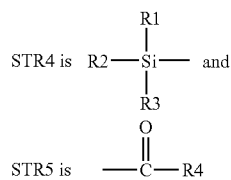

wherein $R_1$, $R_2$, $R_3$ is hydrogen, an alkyl, alkenyl, aryl, alkylaryl or arylalkyl with 1 to 10 carbon atoms and wherein $R_4$ is an alkyl, alkenyl, aryl, alkylaryl or arylalkyl with 1 to 10 carbon atoms.

4. The membrane according to claim 1, comprising monosaccharide derivatives bound via glycoside bonds and that include $C_1$-$C_4$, $C_1$-$C_1$ or $C_1$-$C_6$ bonds or a combination of any two or more thereof.

5. The membrane according to claim 1, comprising saccharide derivatives produced by acetylisation or silylation of the family of saccharides with a cyclic structure with five or six ring atoms or a linear structure, wherein monosaccharide, disaccharide, trisaccharide or dextrin can be contained.

6. The membrane according to claim 5, comprising monosaccharide which contains any one of arabinose, lyxose, ribose, desoxyribose, xylose, ribulose, xylulose, allose, altose, galactose, glucose, gulose, idose, mannose, tagatose, fructose, mannoheptulose, sedoheptulose, octolose, 2-keto-3-deoxy-manno-octonate, sialose, or a combination of any two or more thereof.

7. The membrane according to claim 5, wherein the saccharide derivative includes a disaccharide derivative derived from any one of sucrose, lactose, maltose, trehalose, or a combination of any two or more thereof.

8. The membrane according to claim 5 wherein the saccharide derivative includes a dextrin derivative derived from any one of α-cyclodextrin, β-cyclodextrin, γ-cyclodextrin, or other dextrins of different molecular weights of about 900 to about 1,000,000 Dalton, or any combination of two or more thereof.

9. The membrane according to claim 1, comprising a saccharide derivative which can be obtained through acetylisation or silylation of a high molecular weight saccharide.

10. The membrane according to claim 1, including saccharide derivatives obtained by acetylisation or silylation, and wherein the saccharide derivatives are homogeneously soluble with the homopolymer in an organic solvent.

11. The membrane according to claim 1, comprising a saccharide derivative that has an insignificantly low vapor pressure and that is temperature-stable at over 100° C.

12. The membrane according to claim 1, wherein the separation layer contains about 5 to about 60 wt. % saccharide derivatives.

13. The membrane according to claim 1, wherein the separation layer comprises poly-4-methyl-1-pentene.

14. The membrane according to claim 1, wherein the support layer comprises a polymer or an inorganic material.

15. The membrane according to claim 1, wherein the support layer includes any one of polysulfone, polyethersulfone, polphenylsulfone, polyacrylonitrile, cellulose acetate, polyetherimide or polyimide, or a combination of any two or more thereof.

16. A method for the production of a membrane, comprising:
preparing a saccharide derivative through acetylisation of starch or glycogen or through silylation of cellulose, starch or glycogen, wherein the saccharide derivative has a cyclic structure with five or six ring atoms, or a linear structure, or comprises monosaccharide derivatives which are bound via glycoside bonds, wherein the number of monosaccharides bound in this manner is 2 to about 1,000, or a combination of any two or more thereof;
preparing a homogeneous solution which comprises the saccharide derivative and a homopolymer in a solvent; and
pouring the homogenous solution onto a support layer.

17. The method of claim 16, further comprising evaporating the solvent after pouring the homogenous solution onto the support layer.

18. The method of claim 17, wherein the support layer is a porous support layer.

19. A gas separation module with a membrane according to claim 1.

20. A method for the operation of a gas separation module, comprising: flowing a gas through a separation module according to claim 19.

* * * * *